United States Patent
Lee et al.

(10) Patent No.: US 8,979,061 B2
(45) Date of Patent: Mar. 17, 2015

(54) SUPPORTING UNIT FOR OIL PUMP OF CONTINUOUSLY VARIABLE TRANSMISSION

(75) Inventors: Hyun Ku Lee, Seoul (KR); Moosuk Kim, Hwaseong-si (KR); Kihyup Kim, Seoul (KR)

(73) Assignees: Hyundai Motor Company, Seoul (JP); Kia Motors Corporation, Seoul (KR)

( * ) Notice: Subject to any disclaimer, the term of this patent is extended or adjusted under 35 U.S.C. 154(b) by 686 days.

(21) Appl. No.: 13/305,577

(22) Filed: Nov. 28, 2011

(65) Prior Publication Data
US 2013/0037690 A1   Feb. 14, 2013

(30) Foreign Application Priority Data
Aug. 8, 2011   (KR) .................. 10-2011-0078666

(51) Int. Cl.
*F16H 57/00*   (2012.01)
*F16H 57/04*   (2010.01)

(52) U.S. Cl.
CPC ........ *F16H 57/0441* (2013.01); *F16H 57/0489* (2013.01)
USPC ............ 248/638; 475/206; 180/337

(58) Field of Classification Search
USPC ........... 248/638, 672, 674; 475/206; 180/337, 180/344, 377; 701/51
See application file for complete search history.

(56) References Cited

U.S. PATENT DOCUMENTS

| 5,094,078 | A | * | 3/1992 | Nishimura et al. | 60/487 |
| 7,686,137 | B2 | * | 3/2010 | Tominaga et al. | 184/6.12 |
| 2006/0068963 | A1 | * | 3/2006 | Sugano et al. | 475/206 |
| 2008/0293530 | A1 | * | 11/2008 | Makita | 474/152 |
| 2009/0286641 | A1 | * | 11/2009 | List | 474/202 |
| 2010/0005925 | A1 | * | 1/2010 | Oomura | 74/606 R |
| 2012/0128521 | A1 | * | 5/2012 | Schneider et al. | 418/166 |

FOREIGN PATENT DOCUMENTS

| JP | 2006-70916 A | 3/2006 |
| JP | 2010-235056 A | 10/2010 |
| JP | 4676515 B2 | 2/2011 |
| KR | 1999-021408 A | 3/1999 |
| KR | 20-0170912 Y1 | 12/1999 |
| KR | 10-2009-0016250 A | 2/2009 |

* cited by examiner

*Primary Examiner* — Steven Marsh
(74) *Attorney, Agent, or Firm* — Morgan, Lewis & Bockius LLP

(57) ABSTRACT

A supporting unit apparatus for an oil pump of a continuously variable transmission (CVT) may include the CVT disposed in a transmission housing, wherein an input shaft and a CVT case cover thereof may be disposed thereto, the oil pump which may be disposed in the transmission housing independent from the CVT and of which a rotating shaft and an oil pump case cover may be disposed thereto, a connecting member which engages the input shaft of the CVT and the rotating shaft of the oil pump for transmitting rotation of the input shaft to the rotating shaft, and a supporting unit which connects the CVT and the oil pump for preventing relative motion of the CVT and the oil pump.

12 Claims, 3 Drawing Sheets

SUPPORTING UNIT FOR OIL PUMP OF CONTINUOUSLY VARIABLE TRANSMISSION

CROSS-REFERENCE TO RELATED APPLICATION

The present application claims priority to Korean Patent Application No. 10-2011-0078666 filed in the Korean Intellectual Property Office on Aug. 8, 2011, the entire contents of which is incorporated herein for all purposes by this reference.

BACKGROUND OF THE INVENTION

1. Field of the Invention

The present invention relates to a supporting unit for an oil pump of a CVT. More particularly, the present invention relates to a supporting unit for an oil pump of a CVT which may improve mutual operability between an input shaft of a CVT and a rotating shaft of an oil pump.

2. Description of Related Art

Generally, an oil pump of an automatic transmission may be classified into an external gear pump and an internal gear pump, and a CVT (Continuously Variable Transmission) usually uses the external gear pump.

The CVT is equipped with conical pulleys mounted to an input shaft and an output shaft respectively and gap of the conical pulleys is variable, and a belt or a chain is used for connecting the pulleys. In CVT, when the gap between the conical pulleys are increased, the belt or chain approaches to a center of the pulleys, and hydraulic pressure is applied to control the gap. And thus, the CVT usually requires an oil pump which may generate high hydraulic pressure within a small space. A rotating shaft of the oil pump is connected with an input shaft of the CVT by a chain or a belt for being supplied rotation of the input shaft.

However, when the oil pump receives power from the input shaft of the CVT rotating at a high speed, the input shaft of the CVT and the rotating shaft of the oil pump may oscillate due to operation or rotation of the chain or supplied torque. Also, rotation of the chain may induce noise and vibration.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a supporting unit for an oil pump of a CVT which may prevent oscillation of an input shaft of a CVT and a rotating shaft of an oil pump and also minimize noise and vibration.

In an aspect of the present invention, the supporting unit apparatus for an oil pump of a continuously variable transmission (CVT) may include the CVT disposed in a transmission housing, wherein an input shaft and a CVT case cover thereof are disposed thereto, the oil pump which is disposed in the transmission housing independent from the CVT and of which a rotating shaft and an oil pump case cover are disposed thereto, a connecting member which engages the input shaft of the CVT and the rotating shaft of the oil pump for transmitting rotation of the input shaft to the rotating shaft, and a supporting unit which connects the CVT and the oil pump for preventing relative motion of the CVT and the oil pump.

The connecting member is a chain.

An end of the supporting unit is connected to the CVT case cover, and another end of the supporting unit is connected to the oil pump case cover.

The supporting unit may further include a stepped surface for connecting the CVT case cover and the oil pump case cover which form connecting surfaces that are not on the same level.

The supporting unit connects a CVT case with the CVT case cover, and connects the oil pump with the oil pump case cover, wherein the supporting unit may further include a stepped surface.

The supporting unit is formed as a plate shape.

The supporting unit may further include a stepped surface for connecting the CVT case cover and the oil pump case cover which form connecting surfaces that are not on the same level.

The supporting unit is formed as a hollow plate having a hole therein for preventing vibration and crack due to twist according to interaction between the CVT and the oil pump.

According to the exemplary embodiment of the present invention, the supporting unit is equipped between the CVT and the oil pump for preventing oscillation of an input shaft of a CVT and a rotating shaft of an oil pump.

And the supporting unit may maintain movement of a chain uniformly. And thus, the supporting unit may minimize noise and vibration due to movement of a chain or a belt.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
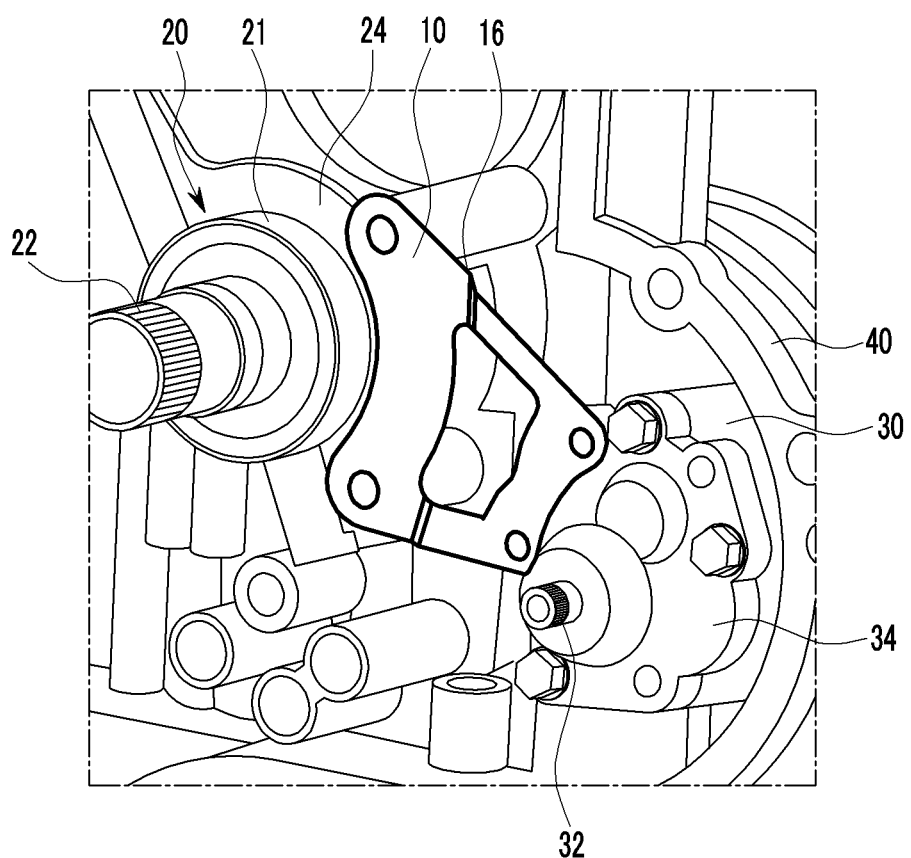
FIG. 1 is a perspective view of a transmission housing of a CVT provided with a supporting unit according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Figure 2:
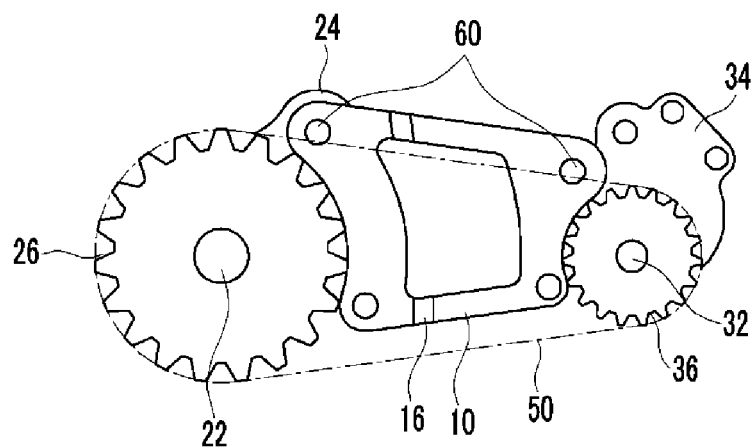
FIG. 2 is a top plan view showing connecting relationship of a CVT and an oil pump according to an exemplary embodiment of the present invention.
Figure 3:
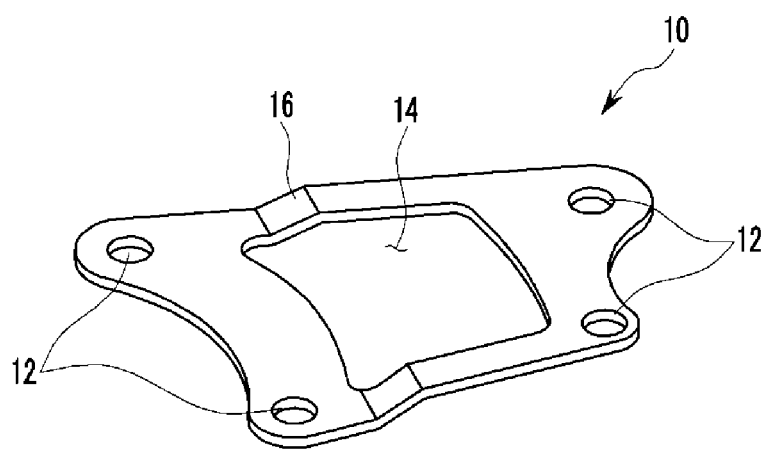
FIG. 3 is a perspective view of a supporting unit according to an exemplary embodiment of the present invention.

FIG. 1 is a perspective view of a transmission housing of a CVT provided with a supporting unit according to an exemplary embodiment of the present invention, FIG. 2 is a top plan view showing connecting relationship of a CVT and an oil pump according to an exemplary embodiment of the present invention, and FIG. 3 is a perspective view of a supporting unit according to an exemplary embodiment of the present invention.

As shown in FIG. 1, a transmission housing 40 of a CVT according to an exemplary embodiment of the present invention includes a CVT 20, an oil pump 30 and a supporting unit 10 therewithin.

The CVT 20 may be any CVT and includes an input shaft 22 and a CVT case cover 24.

The oil pump 30 may be any oil pump and includes a rotating shaft 32 and an oil pump case cover 34. The oil pump may be an external gear pump or an internal gear pump gear pump.

The CVT input shaft 22 and the oil pump rotating shaft 32 are connected by an appropriate connecting member and mutually operated. Due to mutual operation, torque of the input shaft 22 is transmitted to the oil pump rotating shaft 32 for operating the oil pump 30. The appropriate connecting member may be a belt or a chain.

The supporting unit 10 is disposed between the CVT 20 and the oil pump 30. An end of the supporting unit 10 is connected to the CVT case cover 24 and another end of the supporting unit 10 is connected to the oil pump case cover 34.

As shown in FIG. 1 and FIG. 3, if connecting surfaces of the CVT case cover 24 and the oil pump case cover 34, connected to the supporting unit 10, are not on the same level, a stepped surface 16 may be formed to the supporting unit 10 for connecting the supporting unit 10. The stepped surface 16 may be a plate shape or a curved surface.

While the supporting unit 10 is connected to the CVT case cover 24 and the oil pump case cover 34 in FIG. 1, however it is not limited as shown. On the contrary, any fixed constituent elements (e.g., transmission case and oil pump case), which do not prevent operation of the CVT 20 and the oil pump 30 may be used for connecting the supporting unit 10. Merely, one end of the supporting unit 10 is connected to the CVT 20 and another end of the supporting unit 10 is connected to the oil pump 30 for preventing movement or oscillation due to mutual operation of the CVT 20 and the oil pump 30.

As shown in FIG. 2, the CVT 20 and the oil pump 30 according to the exemplary embodiment of the present invention includes a first sprocket 26 and a second sprocket 36 respectively.

The first sprocket 26 is rotatable around the CVT input shaft 22.

The second sprocket 36 is rotatable around the oil pump rotating shaft 32.

The first sprocket 26 and the second sprocket 36 are connected by a chain 50 and so on, and rotate. That is, the first sprocket 26 integrally rotates with the CVT input shaft 22 and the second sprocket 36 rotating with the oil pump rotating shaft 32 receives torque from the first sprocket 26 via the chain 50 to operate the oil pump 30.

The connecting relationship between the sprocket 26 and 36 and the chain 50 may be replaced by a pulley and a belt and so on.

Meanwhile, when the CVT input shaft 22 rotates at a high speed, the chain 50 may generates vibration and noise. Also, the CVT input shaft 22 and the oil pump rotating shaft 32 may move or oscillate.

As described above, the supporting unit 10 may minimize noise and vibration due to movement of a chain or a belt.

As described in the FIG. 1, the supporting unit 10 is connected to the CVT case cover 24 and the oil pump case cover 34.

A connecting member is applied for that connection, the connecting member may be a connecting bolt 60 used for assembling a case of the CVT 20 and assembling a case of the oil pump 30.

In the FIG. 2, it is shown that the connecting bolt 60 used for connecting a case 21 of the CVT 20 with the CVT case cover 24, and the connecting bolt 60 used for connecting the oil pump 30 with the oil pump case cover 34 are used for connecting the supporting unit 10.

As shown in FIG. 3, the supporting unit 10 according to an exemplary embodiment of the present invention includes a connecting hole 12, a hole 14 for preventing crack and a stepped surface 16.

The supporting unit 10 is formed as a plate shape for easily connecting in limited space of the transmission housing. Also, the plate shape may minimize interference with constituent elements such as the chain 50. The supporting unit 10 may be formed as metal material or resin for securing rigidity.

The connecting hole 12 is formed to the supporting unit 10 as plural. Also, the connecting hole 12, as shown in FIG. 2, is used for connecting with the connecting bolt 60.

Positions of the connecting holes 12 are determined for assembling the case of the CVT 20 and assembling of the case of the oil pump 30, and thus separate elements for connecting are not required.

Shape of the supporting unit 10 may be determined according to shapes of the CVT case cover 24 and the oil pump case cover 34.

That is, various shape of the supporting unit 10 may be selected for preventing interference with other constituent elements.

The hole 14 for preventing crack is formed to prevent the supporting unit 10 from cracking. Since the supporting unit 10 is formed as a hollow plate where the hole 14 for preventing crack is formed thereto, and thus the supporting unit 10 may not be cracked due to operations of the CVT input shaft 22 and oil pump rotating shaft 32. Also, the hole 14 for preventing crack may reduce weight of the supporting unit 10.

The stepped surface is formed for connecting the CVT case cover and the oil pump case cover which form connecting surfaces that are not on the same level.

However, shape of the supporting unit 10 is not limited that is shown in the drawings, on the contrary, various shapes may possible according to positions of the connecting surface of the CVT 20 and the oil pump 30.

As described above, according to the exemplary embodiment of the present invention, the supporting unit 10 is disposed between the CVT 20 and the oil pump 30 and prevents the CVT input shaft 22 and the oil pump rotating shaft 32 from moving or oscillating.

And the supporting unit 10 may maintain movement of the chain 50 uniformly. And thus, the supporting unit 10 may minimize noise and vibration due to movement of a chain 50 or a belt.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A supporting unit apparatus for an oil pump of a continuously variable transmission (CVT) comprising:
   the CVT disposed in a transmission housing, wherein an input shaft and a CVT case cover thereof are disposed thereto;
   the oil pump which is disposed in the transmission housing independent from the CVT and of which a rotating shaft and an oil pump case cover are disposed thereto;
   a connecting member which engages the input shaft of the CVT and the rotating shaft of the oil pump for transmitting rotation of the input shaft to the rotating shaft; and
   a supporting unit which connects the CVT and the oil pump for preventing relative motion of the CVT and the oil pump,
   wherein an end of the supporting unit is connected to the CVT case cover; and another end of the supporting unit is connected to the oil pump case cover; and
   wherein the supporting unit further includes a stepped surface for connecting the CVT case cover and the oil pump case cover which form connecting surfaces that are not on the same level.

2. The supporting unit apparatus of claim 1, wherein the connecting member is a chain.

3. The supporting unit apparatus of claim 1, wherein the supporting unit connects a CVT case with the CVT case cover, and connects the oil pump with the oil pump case cover.

4. The supporting unit apparatus of claim 3, wherein the supporting unit further includes a stepped surface.

5. The supporting unit apparatus of claim 1, wherein the supporting unit is formed as a plate shape.

6. The supporting unit apparatus of claim 1, wherein the supporting unit further includes a stepped surface for connecting the CVT case cover and the oil pump case cover which form connecting surfaces that are not on the same level.

7. A supporting unit apparatus for an oil pump of a continuously variable transmission (CVT) comprising:
   the CVT disposed in a transmission housing, wherein an input shaft and a CVT case cover thereof are disposed thereto;
   the oil pump which is disposed in the transmission housing independent from the CVT and of which a rotating shaft and an oil sums case cover are disposed thereto;
   a connecting member which engages the input shaft of the CVT and the rotating shaft of the oil pump for transmitting rotation of the input shaft to the rotating shaft; and
   a supporting unit which connects the CVT and the oil pump for preventing relative motion of the CVT and the oil pump,
   wherein the supporting unit is formed as a hollow plate having a hole therein for preventing vibration and crack due to twist according to interaction between the CVT and the oil pump.

8. The supporting unit apparatus of claim 7, wherein the connecting member is a chain.

9. The supporting unit apparatus of claim 7, wherein the supporting unit connects a CVT case with the CVT case cover, and connects the oil pump with the oil pump case cover.

10. The supporting unit apparatus of claim 9, wherein the supporting unit further includes a stepped surface.

11. The supporting unit apparatus of claim 7, wherein the supporting unit is formed as a plate shape.

12. The supporting unit apparatus of claim 7, wherein the supporting unit further includes a stepped surface for connecting the CVT case cover and the oil pump case cover which form connecting surfaces that are not on the same level.

* * * * *